US011967724B2

(12) United States Patent
Cournoyer

(10) Patent No.: US 11,967,724 B2
(45) Date of Patent: Apr. 23, 2024

(54) BATTERY MODULE SUPPORT BEAM

(71) Applicant: Rivian IP Holdings, LLC, Plymouth, MI (US)

(72) Inventor: Travis Cournoyer, Redondo Beach, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 17/064,163

(22) Filed: Oct. 6, 2020

(65) Prior Publication Data
US 2022/0109132 A1 Apr. 7, 2022

(51) Int. Cl.
*H01M 50/20* (2021.01)
*H01M 10/613* (2014.01)
*H01M 10/643* (2014.01)
*H01M 50/529* (2021.01)

(52) U.S. Cl.
CPC ......... *H01M 50/20* (2021.01); *H01M 10/613* (2015.04); *H01M 10/643* (2015.04); *H01M 50/529* (2021.01)

(58) Field of Classification Search
CPC .. H01M 10/123; H01M 50/204; H01M 50/20; H01M 10/613; H01M 10/643; H01M 50/213; H01M 50/264; H01M 10/655; H01M 50/529
See application file for complete search history.

(56) References Cited

U.S. PATENT DOCUMENTS

| 2015/0325824 | A1* | 11/2015 | Hasegawa | H01M 50/30 |
| | | | | 429/151 |
| 2016/0285142 | A1* | 9/2016 | Kimura | B60L 58/27 |
| 2017/0018750 | A1* | 1/2017 | Wintner | H01M 50/502 |
| 2017/0301964 | A1* | 10/2017 | Murakami | H01M 50/20 |
| 2018/0277808 | A1* | 9/2018 | Kruszelnicki | H01M 50/20 |
| 2018/0294451 | A1* | 10/2018 | Oechsle | H01M 50/502 |

(Continued)

FOREIGN PATENT DOCUMENTS

| CN | 106030854 A | 10/2016 | |
| CN | 109075370 A * | 12/2018 | .......... H01M 50/502 |

(Continued)

OTHER PUBLICATIONS

Machine translation of CN109075370A (Year: 2017).*

*Primary Examiner* — Cynthia K Walls
(74) *Attorney, Agent, or Firm* — Haley Guiliano LLP

(57) ABSTRACT

A battery support beam and battery module including the battery support beam are provided. The battery support beam includes a first end, a second end opposite the first end, and a battery support section between the first end and the second end. The battery support section includes a plurality of cylindrical sleeves arranged in a predetermined pattern, each having a cylindrical sidewall having an open-ended top and an open-ended bottom. Each of the cylindrical sidewalls is configured to be arranged around a cylindrical middle section of one of a plurality of cylindrical battery cells. The battery module includes a plurality of cylindrical battery cells including a plurality of groups of battery cells arranged in the predetermined pattern. The battery module further includes a battery support section for each of the plurality of groups of battery cells.

19 Claims, 9 Drawing Sheets

(56) References Cited

U.S. PATENT DOCUMENTS

2019/0305262 A1* 10/2019 Nakasawa ............ H01M 50/213
2020/0044227 A1*  2/2020 Ryu ................... H01M 10/6556

FOREIGN PATENT DOCUMENTS

| CN | 109328407 A | 2/2019 | |
|---|---|---|---|
| CN | 110088938 A | 8/2019 | |
| CN | 110970585 A | 4/2020 | |
| JP | 2005-317458 A | 11/2005 | |
| JP | 2015-156320 A | 8/2015 | |
| JP | 2019-518313 A | 6/2019 | |
| JP | 2020-095777 A | 6/2020 | |
| WO | 2014/119287 A1 | 8/2014 | |
| WO | 2016/067517 A1 | 5/2016 | |
| WO | WO-2018194296 A1 * | 10/2018 | .......... H01M 10/643 |
| WO | 2019/241703 A2 | 12/2019 | |

* cited by examiner

BATTERY MODULE SUPPORT BEAM

SUMMARY

It is advantageous to package battery cells closely in high-voltage, large-format battery modules to provide high energy density battery modules. Because additional components and hardware add size and thickness to a battery module, in some embodiments it is desirable to use an adhesive to secure components that surround the battery cells (e.g., sidewalls) to the battery cells themselves. However, in order to protect against corrosion, battery cells may be coated with an anti-corrosion plating (e.g., nickel), which is difficult for adhesives to bond to. Accordingly, in some embodiments it would be advantageous to provide a battery module that does not rely solely on securing components directly to the battery cells using an adhesive, without significantly increasing the size of the battery module. Additionally, as the number of battery cells in a single battery module increases, the structural support required to support the battery cells also increases. For example, larger battery modules may be more susceptible to vibrations at lower resonate frequencies. Accordingly, in some embodiments it would also be advantageous to provide a battery module with increased structural support without significantly increasing the size of the battery module. Additionally, as the amp hour capacity of individual battery cells increases, the cell casing will be more likely to fail (e.g., the side of the cell casing splitting) during thermal runaway events (e.g., due to internal battery cell defects). Accordingly, in some embodiments it would be advantageous to structurally support individual battery cells in a battery module to reinforce the cell casings and improve performance during thermal runaway events.

To solve one or more of these problems, a battery support beam and a battery module including the support beam are provided. The battery support beam includes a first end, a second end opposite the first end, and a battery support section between the first end and the second end. The battery support section includes a plurality of cylindrical sleeves arranged in a predetermined pattern, each having a cylindrical sidewall having an open-ended top and an open-ended bottom, each of the cylindrical sidewalls configured to be arranged around a cylindrical middle section of one of a plurality of cylindrical battery cells.

The battery module includes a plurality of cylindrical battery cells arranged in a predetermined pattern, the plurality of cylindrical battery cells includes a first group of cylindrical battery cells and a second group of cylindrical battery cells, and a first battery support beam and a second battery support beam. Each of the first battery support beam and the second battery support beam includes a first end, a second end, and a battery support section between the first end and the second end, and the battery support section includes a plurality of cylindrical sleeves each having a cylindrical sidewall having an open-ended top and an open-ended bottom. Each of the plurality of cylindrical sidewalls of the battery support section of the first battery support beam is arranged around a cylindrical middle section of one of a first subset of the first group of cylindrical battery cells, and each of the plurality of cylindrical sidewalls of the battery support section of the second battery support beam is arranged around a cylindrical middle section of one of a second subset of the second group of cylindrical battery cells.

In some embodiments, each of the plurality of cylindrical sidewalls may have an axial length that is less than or equal to 80 percent of an axial length of each of the plurality of cylindrical battery cells, and each of the plurality of cylindrical sidewall may be substantially centered between a top and a bottom of one of the plurality of cylindrical battery cells along the axial length of the cylindrical battery cell.

In some embodiments of the present disclosure, the predetermined pattern may be a close-hex-pack configuration.

In some embodiments, each of the first battery support beam and the second battery support beam may include a plastic material.

In some embodiments of the present disclosure, the plastic material may be polycarbonate.

In some embodiments, each of the plurality of battery cells may include an exposed region of electrically-active casing that covers a first end and side of the battery cell, the side of the battery cell including the cylindrical middle section.

In some embodiments, the plurality of cylindrical sleeves of the battery support section of the first battery support beam and the plurality of cylindrical sleeves of the battery support section of the second battery support beam may include a plurality of adjacent pairs of cylindrical sleeves, and the cylindrical sidewall between each of the plurality of adjacent pairs of cylindrical sleeves may include an electrically conductive pin extending through the cylindrical sidewall to electrically connect the electrically-active casings of cylindrical battery cells arranged in the adjacent pair of cylindrical sleeves.

In some embodiments, each of the first group of cylindrical battery cells may be connected in parallel with each other, and each of the second group of cylindrical battery cells may be connected in parallel with each other.

In some embodiments, the battery module may further include a first sidewall attached to the first end of each the first battery support beam and a second battery support beam, and a second sidewall to the second end of each the first battery support beam and a second battery support beam.

In some embodiments, the battery module may further include a barrier layer disposed between the first group of cylindrical battery cells and the second group of cylindrical battery cells. The barrier layer may electrically isolate sidewalls of the first group of cylindrical battery cells from sidewalls of the second group of cylindrical battery cells.

In some embodiments, the battery module may further include a carrier layer including a plurality of recesses. A first end of each of the plurality of cylindrical battery cells may be disposed into a respective recess of the plurality of recesses.

In some embodiments, the battery module may further include a cooling surface attached to a second end of each of the plurality of cylindrical battery cells.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DESCRIPTION

Figure 6:
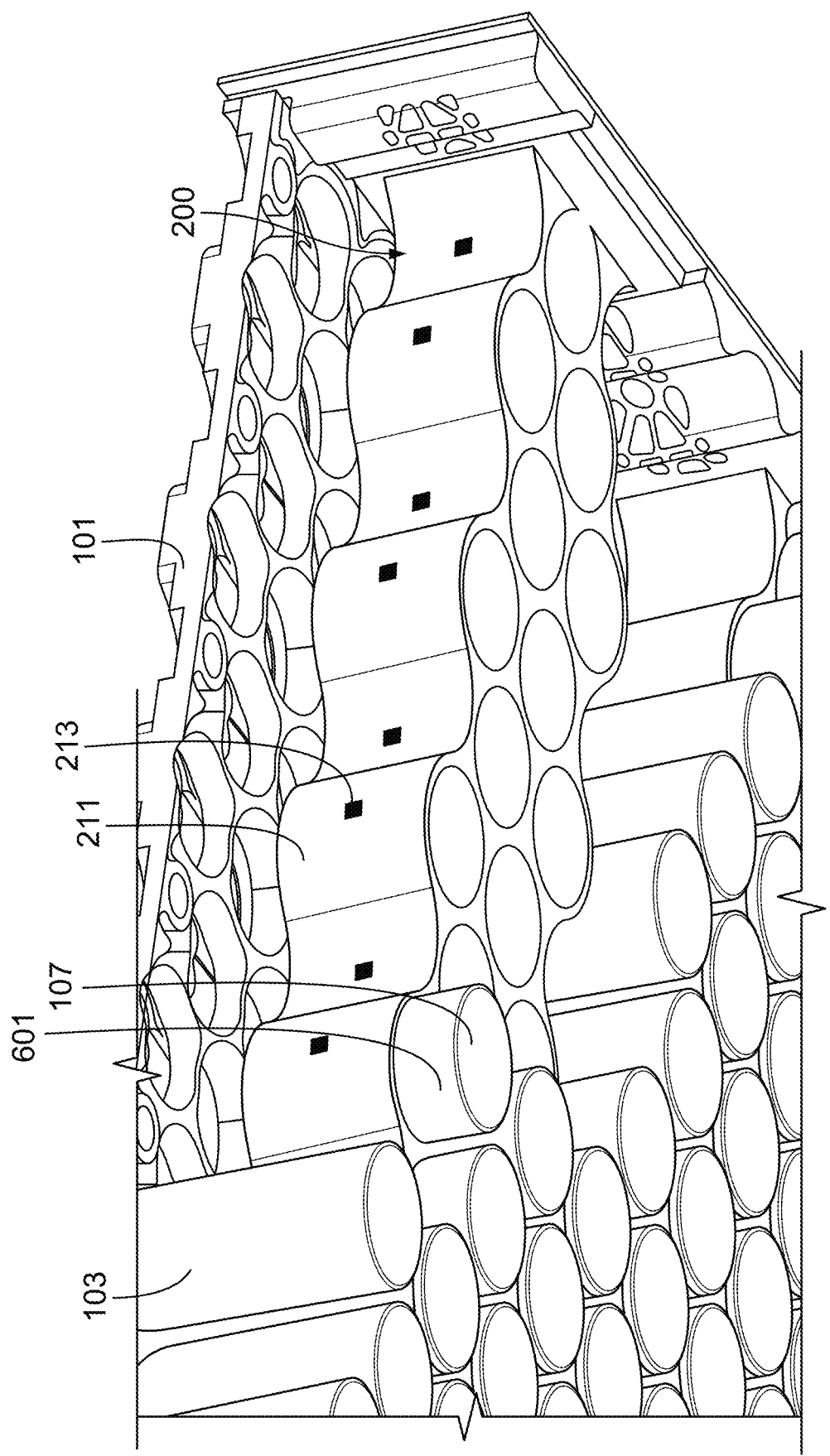
FIG. 6 shows a partial perspective view of the battery module assembly of FIG. 5 following the addition of the two sidewalls, in accordance with some embodiments of the present disclosure.
Figure 7:
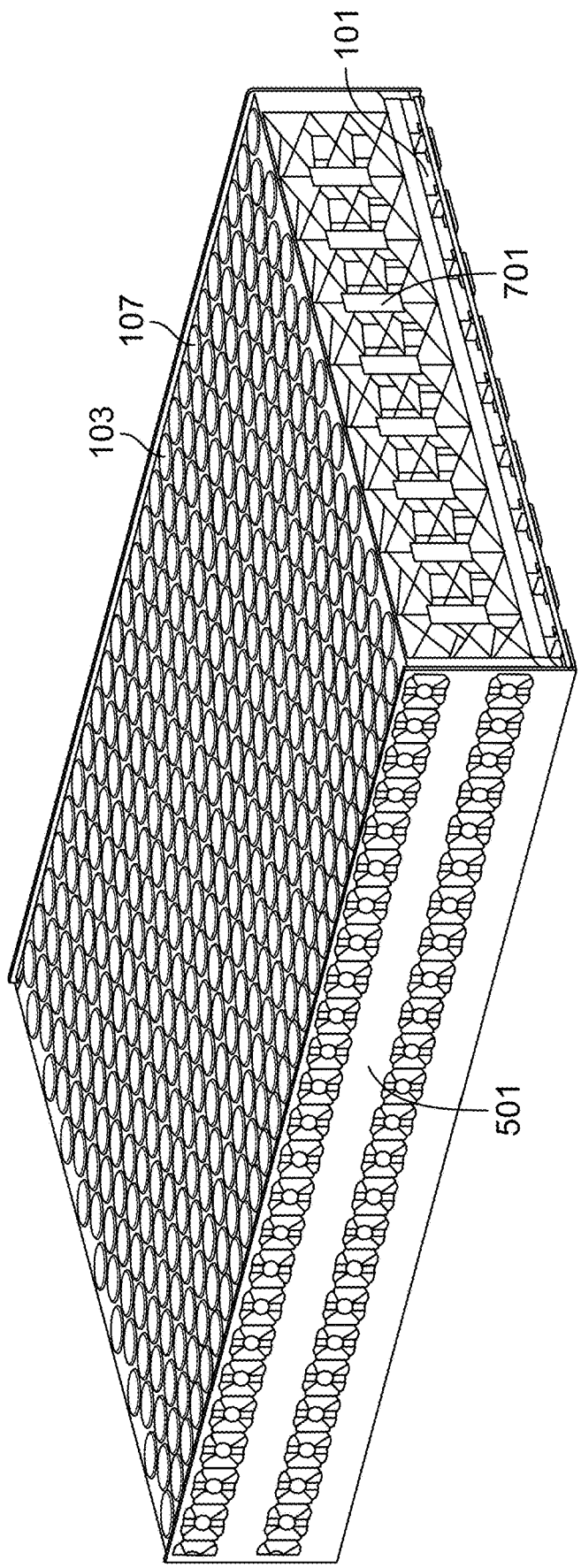
FIG. 7 shows the battery module assembly of FIG. 5 following the addition of two additional sidewalls, in accordance with some embodiments of the present disclosure.
Figure 8:
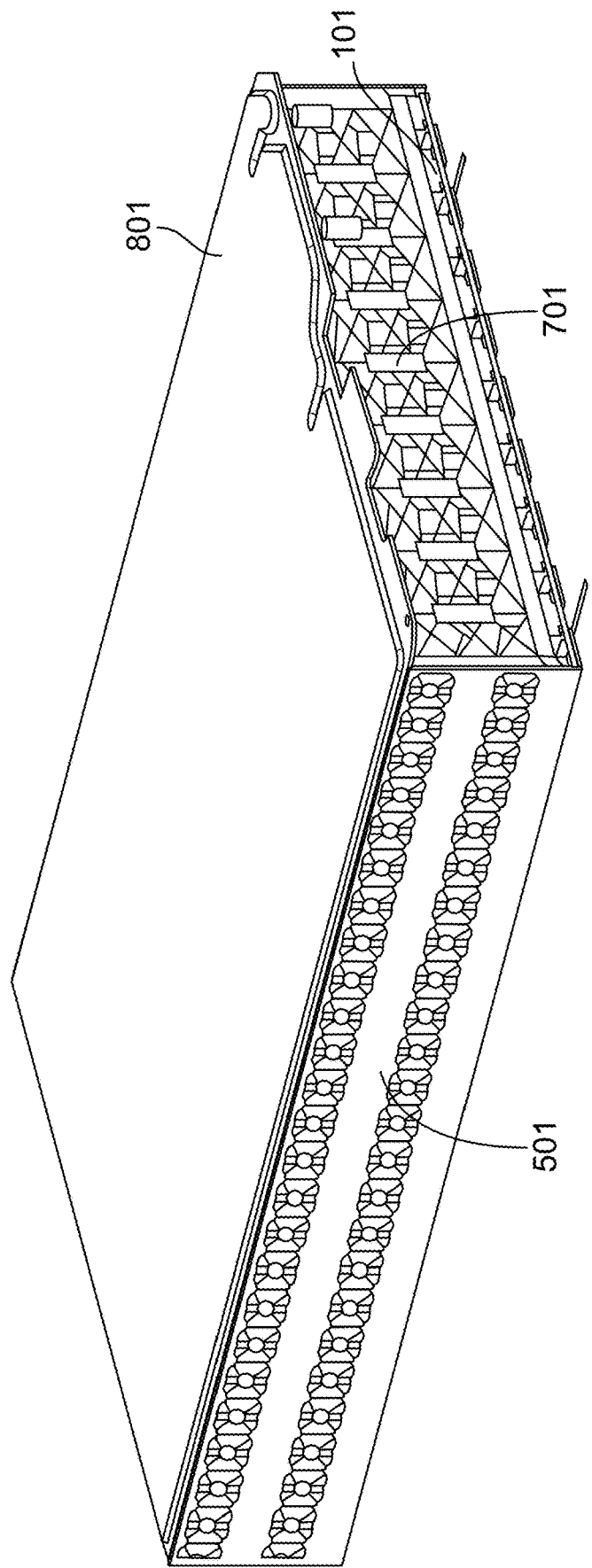
FIG. 8 shows the battery module assembly of FIG. 7 following the installation of a cooling plate, in accordance with some embodiments of the present disclosure.

FIGS. 1-8 show a battery support beam, components of a battery module and a series of steps in a process of assembling a battery module including the battery support beams, such as battery module of FIG. 8, in accordance with some embodiments of the present disclosure.

Figure 1:
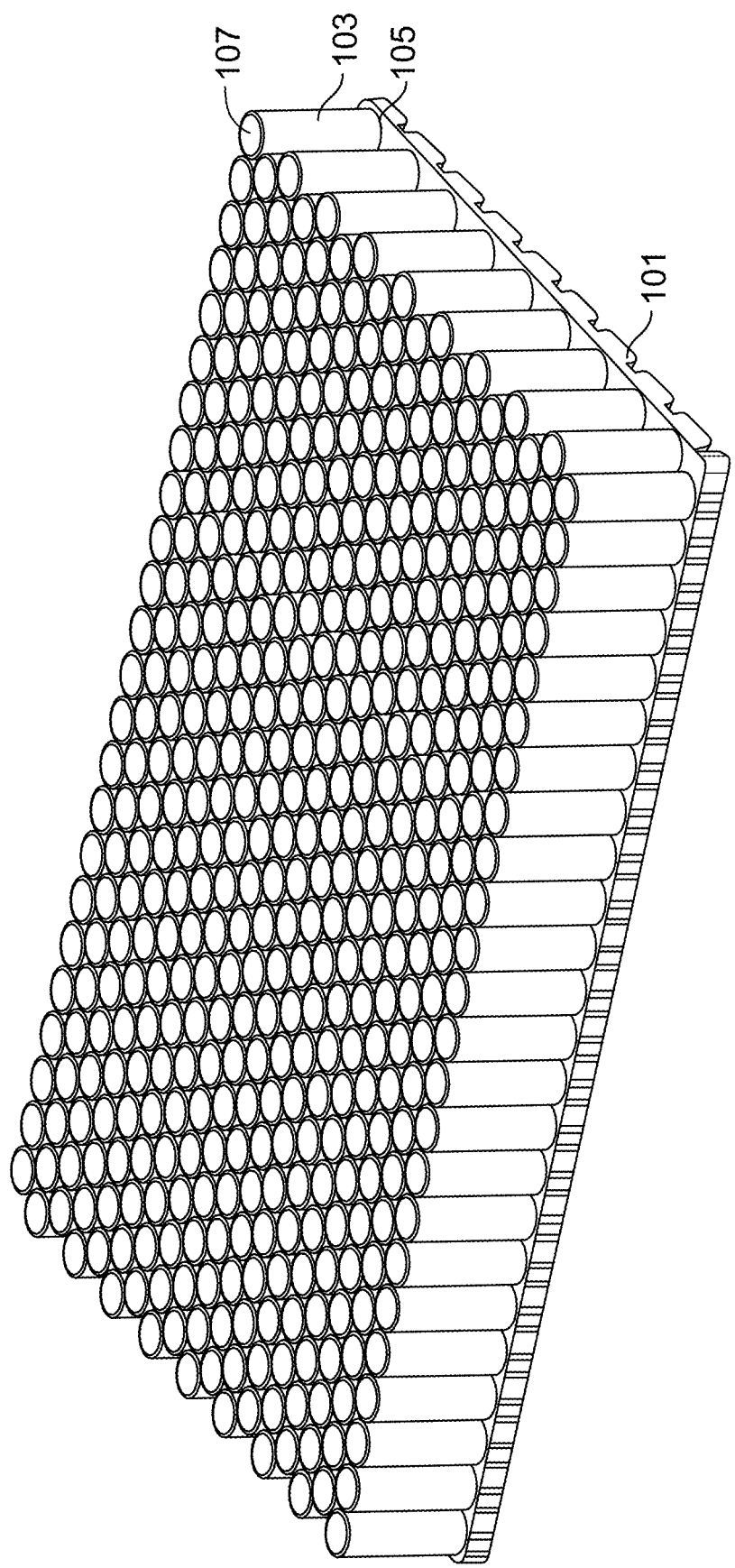
FIG. 1 shows a plurality of battery cells and a carrier layer of a battery module assembly, in accordance with some embodiments of the present disclosure.

FIG. 1 shows a plurality of battery cells 103 and a carrier layer 101 of a battery module assembly, in accordance with some embodiments of the present disclosure. As shown, each of the plurality of battery cells 103 may be cylindrical and may have a first end 105 and a second end 107. In some embodiments of the present disclosure, the first end 105 may include a first electric terminal (e.g., a center button terminal). In some embodiments of the present disclosure, each of the plurality of battery cells 103 may have an exposed region of electrically-active casing or a conductive jacket that covers at least a portion of the second end 107, at least a portion of the first end 105 and a side of each battery cell 103, forming the second electrical terminal (e.g., a rim terminal). In some embodiments of the present disclosure, the exposed region may be formed of nickel-plated steel and/or have an anti-corrosion nickel plating. As shown, the first end 105 of each of the plurality of battery cells 103 may be inserted into and coupled to a respective recess (e.g., using an adhesive) on a first side of the carrier layer 101. In some embodiments of the present disclosure, a current collector assembly including at least one bus bar may be coupled to a second side of the carrier layer and selectively connected to the plurality of battery cells 103. In some embodiments of the present disclosure, the plurality of battery cells 103 may be arranged in a close hexagonal packing configuration. In some embodiments of the present disclosure, the smallest distance between adjacent ones of the plurality of battery cells 103 is less than approximately 1.5 millimeters.

Figure 2A:
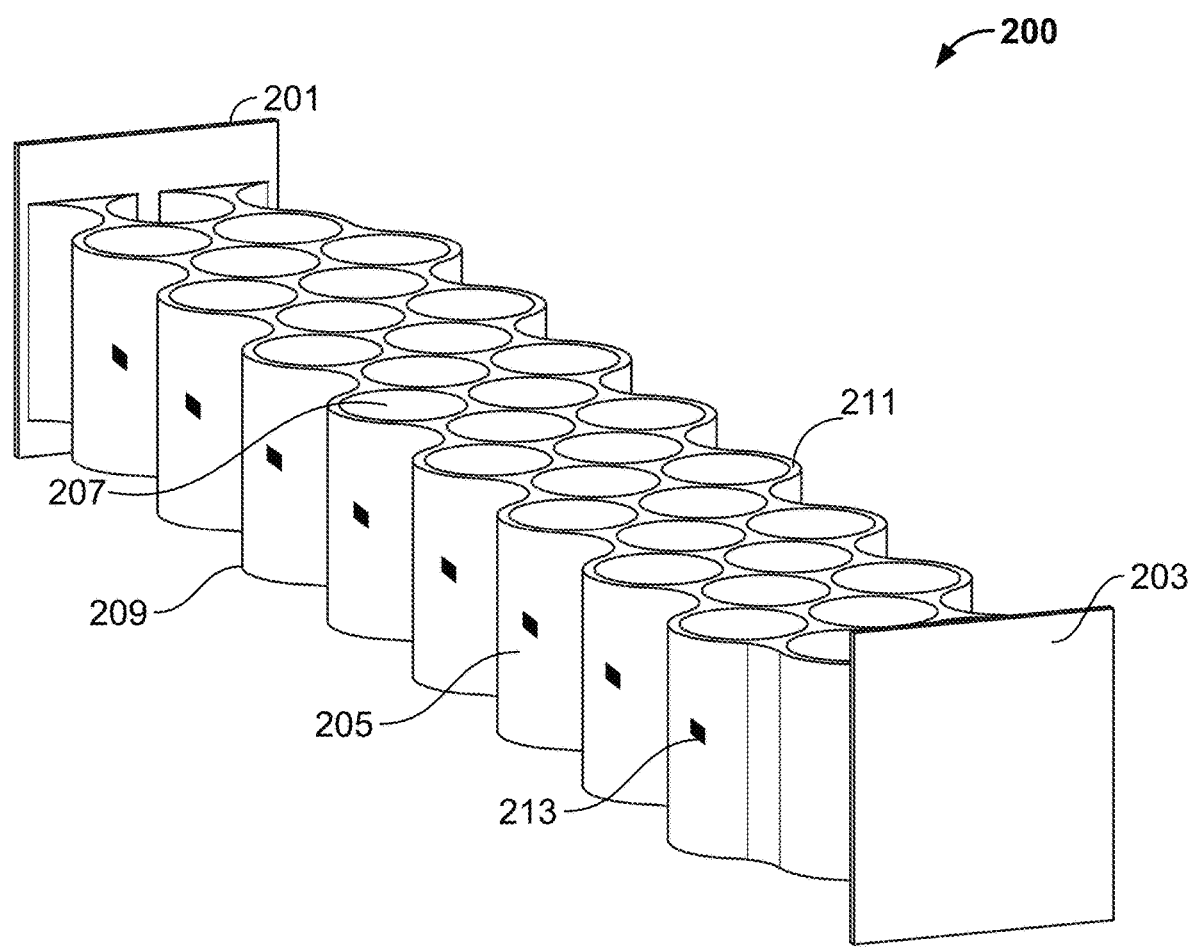
FIGS. 2A, 2B, and 2C respectively show a perspective view, a top view, and a side view of a battery support beam, in accordance with some embodiments of the present disclosure.
Figure 2B:
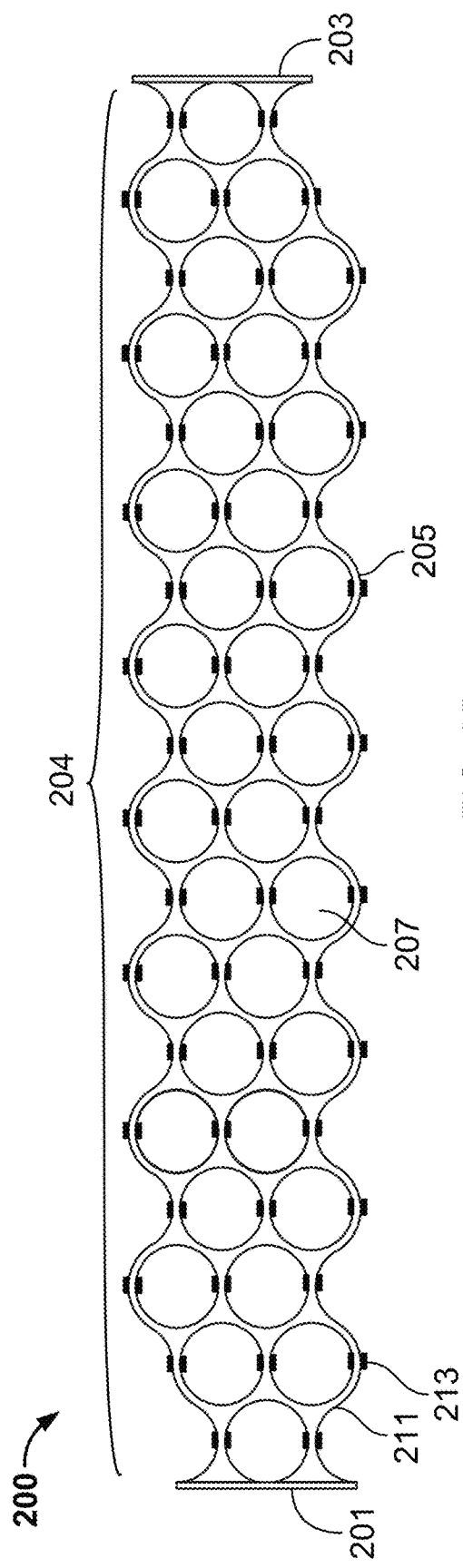
Figure 2C:
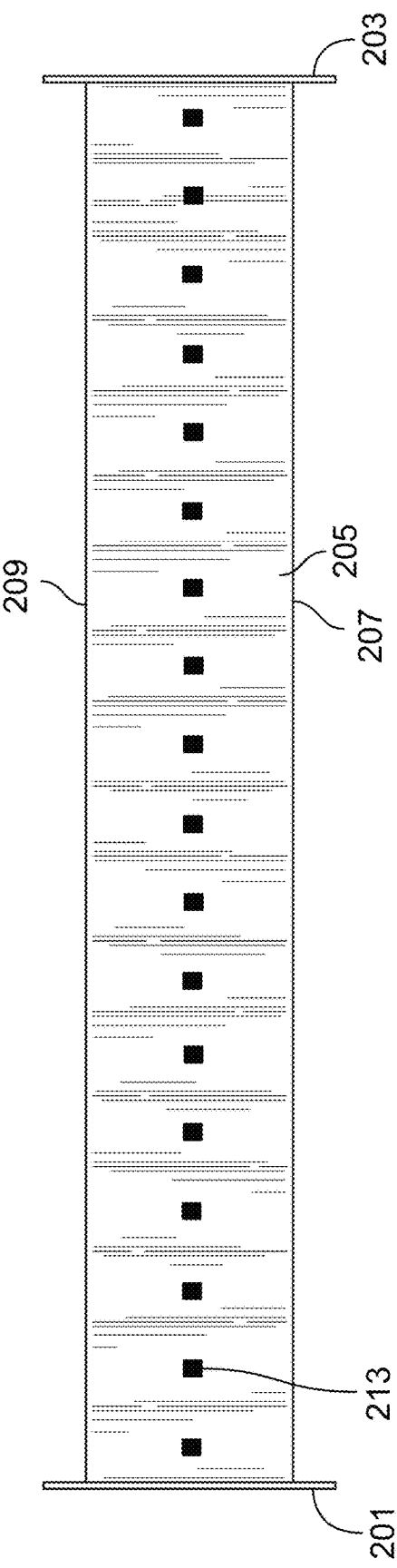

FIGS. 2A, 2B, and 2C respectively show a perspective view, a top view, and a side view of a battery support beam 200, in accordance with some embodiments of the present disclosure. As shown, the battery support beam 200 may include a first end 201, a second end 203 opposite the first end 201, and a battery support section 204 between the first end 201 and the second end 203. The battery support section 204 may include a plurality of cylindrical sleeves 205, each having a cylindrical sidewall 211 having an open-ended top 207 and open-ended bottom 209. As shown, the arrangement of the plurality of cylindrical sleeves 205 corresponds to the arrangement of the plurality of battery cells 103, and the thickness of each of the cylindrical sidewalls 211 corresponds to or is less than the distance (e.g., the smallest distance) between adjacent ones of the plurality of battery cells 103 (e.g., so that the battery support beam 200 may be inserted between a group of battery cells of the plurality of battery cells 103).

In some embodiments of the present disclosure, the battery support beam 200 may be a plastic material. For example, the battery support beam 200 may be a polycarbonate (e.g., FR3040 polycarbonate). However, this is only one example, and the battery support beam 200 may also be a metal material or a fiber material. In some embodiments, it may be advantageous for the battery support beam 200 to be a material that is thermally insulative and electrically conductive. In some embodiments of the present disclosure, when the battery support beam 200 is a non-conductive material (e.g., plastic or fiber), the battery support beam 200 may further include an electrically conductive pin 213 extending through the cylindrical sidewall 211 between adjacent pairs of the plurality of cylindrical sleeves 205. As described in further detail below, the electrically conductive pins 213 may electrically connect the electrically-active casing of cylindrical battery cells 103 arranged in the adjacent pairs of cylindrical sleeves 205.

In some embodiments of the present disclosure, the height of each of the cylindrical sidewalls 211 may be less than the height of each of the plurality of battery cells 103 so that each of the cylindrical sidewalls 211 only covers a cylindrical middle section of a corresponding one of the plurality of battery cells 103. For example, as described in further detail below with reference to FIG. 6, the cylindrical middle section of each of the plurality of battery cells 103 may be 80% or less of the entire length of each of the plurality of battery cells 103, and the cylindrical sidewalls 211 may be substantially centered in this cylindrical middle section so that at least 10% or more of the top and bottom of each of the plurality of battery cells 103 is not covered by the cylindrical sidewall 211. It will be understood that these percentages are merely illustrative and that other relative sizes of battery cells 103 and cylindrical sidewalls 211 may be used. For example, the cylindrical middle section of each of the plurality of battery cells 103 may be 50% or less, 60% or less, 70% or less, or 90% or less of the entire length of each of the plurality of battery cells 103.

Figure 3:
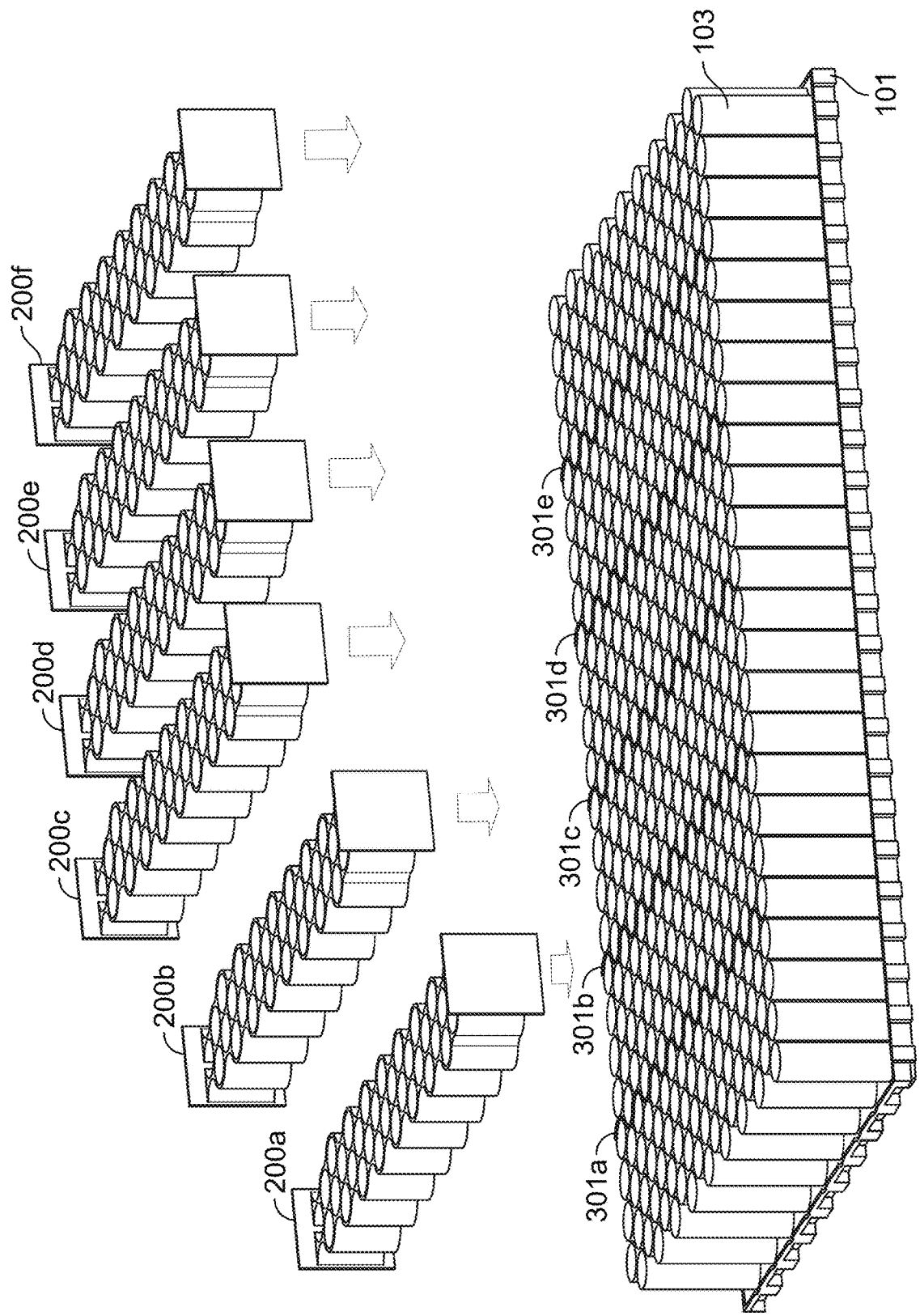
FIG. 3 shows the battery module assembly of FIG. 1 before insertion of a plurality of the battery support beams of FIGS. 2A, 2B, and 2C, in accordance with some embodiments of the present disclosure.

FIG. 3 shows the battery module assembly of FIG. 1 before insertion of a plurality of the battery support beams 200 of FIGS. 2A, 2B, and 2C, in accordance with some embodiments of the present disclosure. As shown, each of the plurality of battery support beams 200 (e.g., 200a, 200b, 200c, 200d, 200e, and 200f) may be inserted between a corresponding group of the plurality of battery cells 103. In some embodiments of the present disclosure, as described in further detail below with reference to FIG. 4, adjacent groups of the plurality of battery cells 103 may be separated from each other by one of the plurality of barrier layers 301 (e.g., 301a, 301b, 301c, 301d, and 301e). FIG. 3 shows the battery module assembly of FIG. 1 following the insertion of the plurality of barrier layers 301 (e.g., dividers between adjacent groups of the plurality of battery cells 103).

Figure 4:
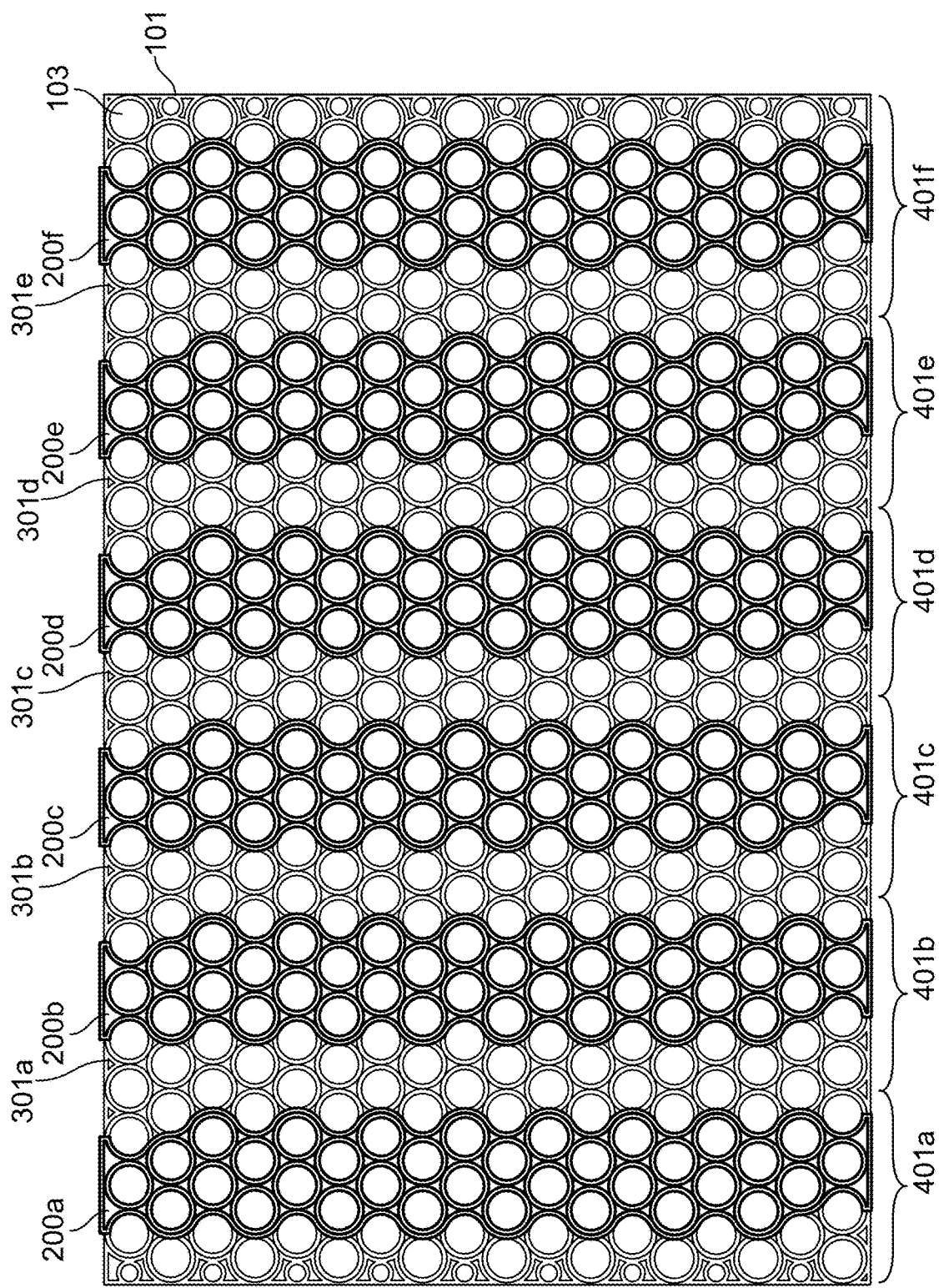
FIG. 4 shows the battery module assembly of FIG. 3, following the insertion of the plurality of battery support beams, in accordance with some embodiments of the present disclosure.

FIG. 4 shows the battery module assembly of FIG. 3, following the insertion of the plurality of battery support beams 200, in accordance with some embodiments of the present disclosure. In some embodiments of the present disclosure, the barrier layers 301 (e.g., 301a, 301b, 301c, 301d, and 301e) may be inserted between groups of the plurality of battery cells 103 at different operating voltages (e.g., parallel groups 401a, 401b, 401c, 401d, 401e, and 401f of the plurality of battery cells 103) to provide electrical insulation in the event that the position of any of the plurality of battery cells 103 shifts (e.g., due to vibration or an impact to the battery module assembly). In some embodiments of the present disclosure, the barrier layers 301 may comprise a fire-resistant material to prevent a fire from spreading between groups of the plurality of battery cells 103. Although five barrier layers 301 are shown, any number of barrier layers 301 may be used. In some embodiments of the present disclosure, the barrier layers 301 may be optional, depending on the specific requirements of a particular battery module. In some embodiments of the present disclosure, it may be advantageous to support battery cells 103 from more than one of the groups (e.g., 401a-401f) with a single battery support beam 200. In this case, the single support beam 200 may be formed of a non-conductive material and the electrically conductive pins 213 may be omitted to provide electrical insulation between the battery cells 103 supported by the single support beam 200. However, this is only an example, and the electrically conductive pins 213 may also be selectively omitted to provide electrical insulation only between battery cells 103 at different operating voltages (e.g., from different groups 401a-401f), while still electrically connecting battery cells 103 at the same operating voltage (e.g., from the same group 410a-401f). That is, the electrically conductive pins 213 may be omitted in the cylindrical sidewalls 211 separating battery cells 103 at different operating voltages (e.g., from different groups 401a-401f).

In some embodiments of the present disclosure, each of the plurality of battery support beams 200 (e.g., 200a, 200b, 200c, 200d, 200e, and 200f) may be inserted between a corresponding group 401 (e.g., 401a, 401b, 401c, 401d, 401e, and 401f) of the plurality of battery cells 103. Although six battery support beams 200 are shown, any number of battery support beams 200 may be used. In some embodiments of the present disclosure, each of the battery support beams 200 may be secured to a corresponding group 401 of the plurality of battery cells 103 by an adhesive. For example, the adhesive may be applied to cylindrical sidewalls 211 of the cylindrical sleeves 205 before the battery support beam 200 is inserted between the corresponding group 401 of the plurality of battery cells 103. However, this is only one example, and each of the battery support beams 200 may also be secured to the corresponding group 401 of the plurality of battery cells 103 by an interference fit.

In some embodiments of the present disclosure, batteries cells of each group 401 of the plurality of battery cells 103 may be electrically connected to each other (e.g., by at least one current collector assembly including at least one busbar). Additionally, as described in further detail with reference to FIG. 6, the electrically-active casing of certain adjacent battery cells 103 in each group 401 may be electrically connected to each other by a corresponding battery support beam 200 of by electrically conductive pins 213 in the corresponding battery support beam 200.

Figure 5:
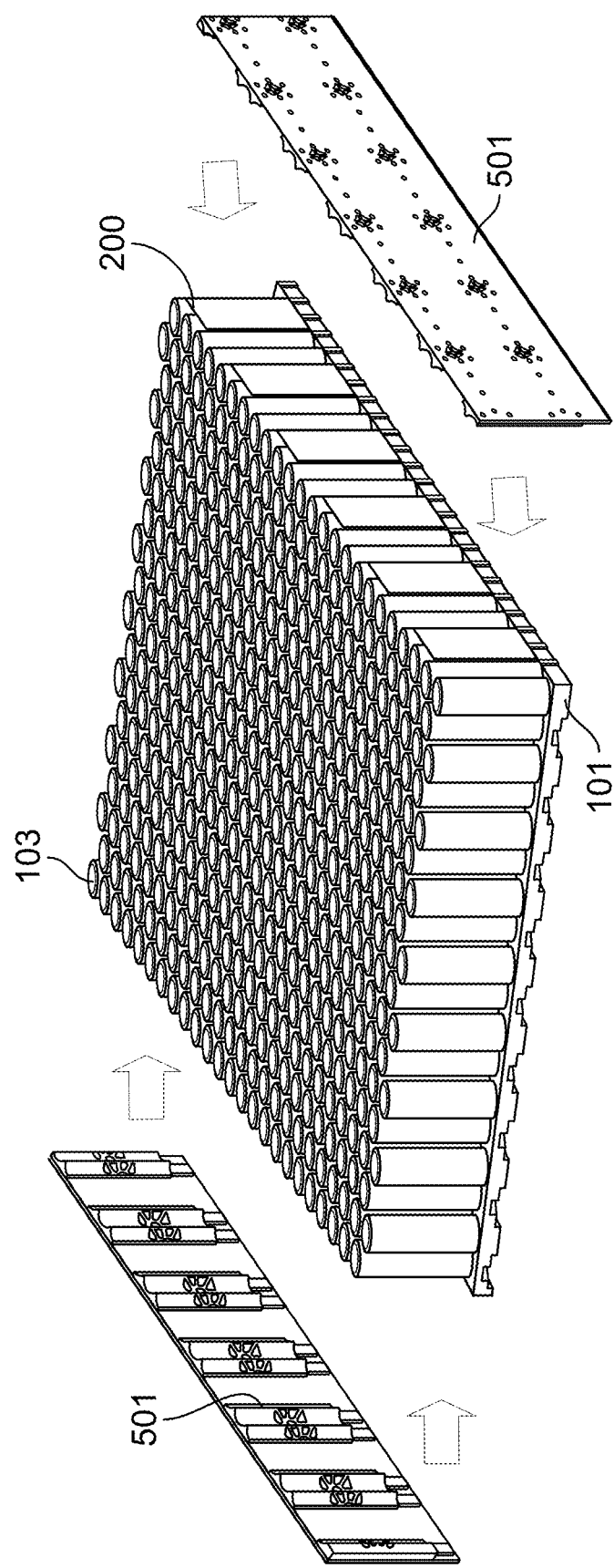
FIG. 5 shows the battery module assembly of FIG. 4 before two sidewalls are attached, in accordance with some embodiments of the present disclosure.

FIG. 5 shows the battery module assembly of FIG. 4 before two sidewalls 501 are attached, in accordance with some embodiments of the present disclosure. As shown, a first one of the sidewalls 501 may be attached to a first side of the battery module assembly and a second one of the sidewalls 501 may be attached to a second side of the battery module assembly. For example, an adhesive may be applied to the first ends 201 of each of the plurality of battery support beams 200. Alternatively or additionally, the adhesive may also be applied to the battery cells 103 along the first side of the battery module assembly and the interior side of the first one of the sidewalls 501. As shown, the first one of the sidewalls 501 may then be pressed into the first ends 201 of each of the plurality of battery support beams 200 and the battery cells along the first side of the battery module assembly. The second one of the sidewalls 501 may be attached to the second side of the battery support module in a similar manner. As shown, the interior sides of each of the two sidewalls 501 may be formed to be substantially flush with both the ends (201 or 203) of each of the plurality of battery support beams 200 and the battery cells along the side of the battery module assembly.

In some embodiments, each of the first and second ends 201 and 203 may include at least one through-hole so that when the corresponding one of the sidewalls 501 is pressed into the side of the battery module assembly, some of the adhesive may be forced into the at least one through-hole such that when the adhesive cures, the cured adhesive may also act as a kind of rivet(s), further securing the sidewalls 501 to the battery module assembly.

FIG. 6 shows a partial perspective view of the battery module assembly of FIG. 5 following the addition of the two sidewalls 501, in accordance with some embodiments of the present disclosure. For purposes of description, several of the battery cells 103 are shown as being removed. As shown, each of the cylindrical sidewalls 211 only covers a cylindrical middle section of a corresponding one of the plurality of battery cells 103. For example, an end section 601 of each of the plurality battery cells 103 (e.g., corresponding to the second end 107) may not be covered by the cylindrical sidewall 211. In some embodiments of the present disclosure, the length of the end section 601 may be 10% of the entire length of the battery cell 103. In some embodiments of the present disclosure, another end section each of the plurality of battery cells 103 (e.g., corresponding to the first end 105) opposite the end section 601 may have the same length as the end section 601 and the cylindrical sidewalls 211 are substantially centered in the cylindrical middle section of each of the plurality of battery cells 103.

In some embodiments of the present disclosure, the length of the cylindrical sidewalls 211 (e.g., from the open-ended top 207 to the open-ended bottom 209) may be adjusted based on the requirements of the battery module assembly. For example, in high load applications, it may be advantageous to provide cylindrical sidewalls 211 with a shorter length (e.g., covering less than 80% of the length of the battery cells 103) to allow the battery cells 103 to expand slightly. In other applications, it may be advantageous to provide cylindrical sidewalls 211 with a longer length (e.g., covering more than 80% of the length of the battery cells 103) to reinforce the sidewalls of each of the plurality of battery cells 103. In some embodiments of the present disclosure, it may be advantageous to not center the cylindrical sidewalls 211 in the cylindrical middle section of a corresponding one of the plurality of battery cells 103, depending on the requirements of the battery module assembly. For example, it may be advantageous to leave a larger portion of one of the end sections of each of the plurality of battery cells 103 uncovered by the cylindrical sidewall 211 (e.g., end section 601).

As shown, once each of the cylindrical sleeves 205 arranged around a cylindrical middle section of a corresponding battery cell 103, the electrically conductive pin 213 may electrically connect the electrically-active casing of cylindrical battery cells 103 arranged in the adjacent pair of cylindrical sleeves 205, by contacting each of the electrically-active casings. Returning to FIG. 2B, it may be advantageous to modify the arrangement or number of the electrically conductive pins 213 in each the cylindrical sleeves 205, depending on the requirements of the battery module assembly. For example, it may be advantageous to electrically connect the electrically active casing of one of the battery cells 103 to every adjacent battery cell 103 or modify the battery cells 103 that are electrically connected through the electrically conductive pins 213. In some embodiments of the present application, the electrically conductive pins 213 may be omitted. The conductive pins 213 may be any suitable conductive connector for electrically connecting adjacent casings of cylindrical battery cells 103 (e.g., a continuous sheet of metal, metal mesh, metal wires, conductive material, etc. that is molded between top and bottom portions (207, 209) of the cylindrical sleeves 205).

FIG. 7 shows the battery module assembly of FIG. 5 following the addition of two additional sidewalls 701, in accordance with some embodiments of the present disclosure. As shown, the addition of sidewalls 701 results in the plurality of battery cells being incased on at least five sides (i.e., by the carrier layer 101 on one side, by the sidewalls 501 on two sides, and by sidewalls 701 on two sides). As shown, the second ends 107 of the plurality of battery cells 103 may remain exposed. In some embodiments of the present disclosure, the sidewalls 701 are attached to the battery module assembly by an adhesive.

FIG. 8 shows the battery module assembly of FIG. 7 following the installation of a cooling plate 801, in accordance with some embodiments of the present disclosure. In some embodiments of the present disclosure, the cooling plate 801 may be coupled to the exposed ends 107 of the plurality of battery cells 103 by an adhesive (e.g., a thermal interface material).

In some embodiments of the present disclosure, the thermal transfer plate may be used to selectively heat or cool the battery module assembly. In some embodiments of the present disclosure, the components described above in relation to FIG. 1 may form a first battery submodule that may be combined with a second battery submodule similar to the first battery submodule. For example, the first and second battery submodules may be formed on opposite sides of the cooling plate 801.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A battery support beam comprising:
a battery support section between a first end and a second end,
wherein:
the battery support section comprises a plurality of cylindrical sleeves arranged in a predetermined pattern, each having a cylindrical sidewall;
the first end is configured to be attached to a first sidewall and the second end is configured to be attached to a second sidewall such that the first sidewall and the second sidewall partially encase the battery support beam and a plurality of cylindrical battery cells; and
the cylindrical sidewall between each of a plurality of adjacent pairs of cylindrical sleeves comprises an electrically conductive connector extending through the cylindrical sidewall and configured to electrically connect electrically-active casings of cylindrical battery cells arranged in the adjacent pair of cylindrical sleeves and connected in parallel.

2. The battery support beam of claim 1, wherein each of the plurality of cylindrical sleeves shares a sidewall with at least one other cylindrical sleeve of the plurality of cylindrical sleeves.

3. The battery support beam of claim 1, wherein each of the cylindrical sidewalls has an axial length that is less than or equal to 80 percent of an axial length of each of the plurality of cylindrical battery cells.

4. The battery support beam of claim 1, wherein each of the cylindrical sidewalls is configured to be substantially centered between a top and a bottom of one of the plurality of cylindrical battery cells along an axial length of the cylindrical battery cell, so that at least 10% or more of a top and a bottom of each of the plurality of cylindrical battery cells is not covered by the cylindrical sidewall of each of the plurality of cylindrical sidewalls.

5. The battery support beam of claim 1, wherein the predetermined pattern is a close-hex-pack configuration.

6. The battery support beam of claim 1, wherein the battery support beam comprises a plastic material.

7. The battery support beam of claim 1, wherein each electrically conductive connector comprises an electrically conductive pin.

8. A battery comprising:
a plurality of cylindrical battery cells; and
a first battery support beam and a second battery support beam, each comprising a first end, a second end, and a battery support section between the first end and the second end, the battery support section of each comprising a plurality of cylindrical sleeves each having a cylindrical sidewall having an open-ended top and an open-ended bottom,
wherein:
each of the cylindrical sidewalls of the first battery support beam is arranged around a cylindrical middle section of one of a first subset of the plurality of cylindrical battery cells;
each of the cylindrical sidewalls of the second battery support beam is arranged around a cylindrical middle section of one of a second subset of the plurality of cylindrical battery cells; and
the first battery support beam is adjacent to the second battery support beam and a third subset of the plurality of cylindrical battery cells is arranged between the battery support sections of the adjacent first and second battery support beams.

9. The battery of claim 8, comprising:
a first sidewall attached to the first end of each of the first battery support beam and the second battery support beam;
a second sidewall opposite the first sidewall attached to the second end of each of the first battery support beam and the second battery support beam;
a third sidewall attached to a first end of each of the first sidewall and the second sidewall;

a fourth sidewall opposite the third sidewall attached to a second end of each of the first sidewall and the second sidewall; and a carrier layer, wherein:

the first sidewall, the second sidewall, the third sidewall, the fourth sidewall, and the carrier layer encase the plurality of cylindrical battery cells, the first battery support beam, and the second battery support beam on five sides.

10. The battery of claim 9, wherein the carrier layer comprises a plurality of recesses, and wherein a first end of each of the plurality of cylindrical battery cells is disposed into a respective recess of the plurality of recesses.

11. The battery of claim 10, wherein each of the plurality of cylindrical battery cells comprises the first end and a second end, the battery further comprising a cooling surface attached to the second end of each of the plurality of cylindrical battery cells.

12. The battery of claim 8, wherein each of the cylindrical sidewalls of the first battery support beam has an axial length that is less than or equal to 80 percent of an axial length of each of the first subset of the plurality of cylindrical battery cells, and wherein each of the cylindrical sidewalls of the first battery support beam is substantially centered between a top and a bottom of one of the first subset of the plurality of cylindrical battery cells along the axial length of the cylindrical battery cell, so that at least 10% or more of a top and a bottom of each of the first subset of the plurality of cylindrical battery cells is not covered by the cylindrical sidewall of each of the cylindrical sidewalls of the first battery support beam.

13. The battery of claim 8, wherein the plurality of cylindrical battery cells are arranged in a close-hex-pack configuration.

14. The battery of claim 8, wherein the first battery support beam comprises a plastic material.

15. The battery of claim 8, wherein each of the plurality of cylindrical battery cells comprises an exposed region of electrically-active casing that covers a first end and a side of each of the plurality of cylindrical battery cells.

16. The battery of claim 15, wherein the plurality of cylindrical sleeves of the battery support section of the first battery support beam and the plurality of cylindrical sleeves of the battery support section of the second battery support beam comprise a plurality of adjacent pairs of cylindrical sleeves, and wherein the cylindrical sidewall between each of the plurality of adjacent pairs of cylindrical sleeves comprises an electrically conductive connector extending through the cylindrical sidewall to electrically connect the electrically-active casings of cylindrical battery cells arranged in the adjacent pair of cylindrical sleeves and connected in parallel.

17. The battery of claim 8, wherein each of the first subset of the plurality of cylindrical battery cells are connected in parallel with each other, and wherein each of the second subset of the plurality of cylindrical battery cells are connected in parallel with each other.

18. The battery of claim 8, further comprising a barrier layer disposed between the first subset of the plurality of cylindrical battery cells and the second subset of the plurality of cylindrical battery cells, wherein the barrier layer electrically isolates sidewalls of the first subset of the plurality of cylindrical battery cells from sidewalls of the second subset of the plurality of cylindrical battery cells.

19. The battery of claim 8, wherein:

the first subset of the plurality of cylindrical battery cells and a first portion of the third subset of the plurality of cylindrical battery cells are connected in parallel with each other; and the second subset of the plurality of cylindrical battery cells and a second portion of the third subset of the plurality of cylindrical battery cells are connected in parallel with each other.

* * * * *